United States Patent Office 2,762,808
Patented Sept. 11, 1956

2,762,808

2,3-ALKYLENEDIOXY-6-NITRO-9-(HYDROXY-ALKYLAMINOALKYLAMINO) ACRIDINES AND THEIR PREPARATION

Edgar Alfred Steck, Guilderland, N. Y., assignor to Sterling Drug Inc., a corporation of Delaware No Drawing. Application October 27, 1953, Serial No. 388,698

19 Claims. (Cl. 260—279)

This invention relates to 2,3-alkylenedioxy-6-nitro-9-(hydroxyalkylaminoalkylamino)acridines, to intermediates therefor and to methods of preparing these acridines.

The 2,3 - alkylenedioxy-6-nitro-9-(hydroxyalkylaminoalkylamino)acridines of my invention have in free base form the structure

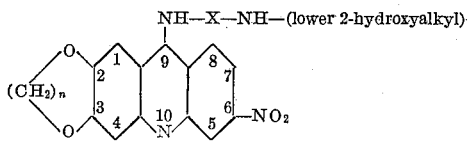

where X is a lower alkylene radical having from two to eight carbon atoms inclusive and having its free valence bonds on different carbon atoms and $n$ is an integer from one to two. These compounds have been found to possess valuable chemotherapeutic properties, for instance, antirickettsial activity.

In the above general formula the lower alkylene radical designated as X has two to eight carbon atoms including such examples as

—CH$_2$CH$_2$—, —CH$_2$CH$_2$CH$_2$—, —CH$_2$CH$_2$CH$_2$CH$_2$—

—CH$_2$CHCH$_3$, —CH$_2$CHCH$_2$CH$_3$, —CH$_2$CH(CH$_3$)CH$_2$—

—CH$_2$C(CH$_3$)$_2$, —CH(CH$_3$)CHCH$_3$, —CH$_2$CH$_2$CH$_2$CH$_2$CH$_2$CH$_2$—

—CH$_2$CH$_2$CH$_2$CH$_2$CH$_2$CH$_2$CH$_2$CH$_2$— and the like. The lower 2-hydroxyalkyl radical of the above formula has preferably two to six carbon atoms, encompassing such radicals having a hydroxy group attached to the carbon atom that is one carbon atom removed from the side chain nitrogen atom, such lower 2-hydroxyalkyl radicals including 2-hydroxyethyl, 2-hydroxypropyl, 2-hydroxy-2-methylpropyl, 2-hydroxybutyl, 2-hydroxy-2-methylpentyl, 2-hydroxyhexyl, and the like.

My 2,3 - alkylenedioxy-6-nitro-9-(hydroxyalkylaminoalkylamino)acridines were prepared preferably by heating a mixture of phenol and the appropriate 2,3-alkylenedioxy-6-nitro-9-haloacridine to form the corresponding 2,3-alkylenedioxy-6-nitro-9-phenoxyacridine as the hydrohalide, which did not need to be isolated, and then heating the 2,3-alkylenedioxy-6-nitro-9-phenoxyacridine hydrohalide with the appropriate hydroxyalkylaminoalkylamine having the formula H$_2$N—X—NH—(lower 2-hydroxyalkyl) where X and the 2-hydroxyalkyl radical are defined and illustrated above. The 2,3-alkylenedioxy-6-nitro-9-chloroacridines are preferably used because of their relatively lower cost. Illustrative of this preparation is the reaction of 2,3-methylenedioxy-6-nitro-9-chloroacridine with phenol to form 2,3-methylenedioxy-6-nitro-9-phenoxyacridine as its monohydrochloride which on treatment, in either pure form or crude form (as directly obtained from the reaction mixture on the first step), with 2-(2-hydroxyethylamino)ethylamine yields 2,3 - methylenedioxy-6-nitro-9-[2-(2-hydroxyethylamino)ethylamino]acridine.

Alternatively, the 2,3 - alkylenedioxy-6-nitro-9-(hydroxyalkylaminoalkylamino)acridines of my invention can be prepared by directly heating the appropriate 2,3-alkylenedioxy-6-nitro-9-haloacridine with a hydroxyalkylaminoalkylamine, without first reacting the former compound with phenol.

The preparation of my 2,3-alkylenedioxy-6-nitro-9-(hydroxyalkylaminoalkylamino)acridines was carried out under acidic conditions. When the reactant was a 2,3-alkylenedioxy-6-nitro-9-haloacridine, an acidic medium was afforded by the presence of the hydrohalic acid formed in the reaction. When the reactant was a 2,3-alkylenedioxy-6-nitro-9-phenoxy-acridine, acidic conditions were produced either by using the 9-phenoxy compound in the form of its hydrohalic acid addition salt or by adding a small amount of a mineral acid.

My invention also comprehends the corresponding intermediate 2,3 - alkylenedioxy - 6 - nitro-9-haloacridines and 2,3 - alkylenedioxy-6-nitro-9-phenoxyacridines, and the preparation of these compounds as illustrated in the examples below.

The 2,3-alkylenedioxy-6-nitro-9-(hydroxyalkylaminoalkylamino)acridines of my invention are therapeutically active whether employed in the form of their free bases or in the form of their salts with relatively non-toxic organic or inorganic acids. These salts can be prepared by treating the appropriate 2,3-alkylenedioxy-6-nitro-9-(hydroxyalkylaminoalkylamino)acridine described above with the appropriate acid. In practicing the invention, it has been found convenient to isolate the compounds in the form of their hydrochlorides. However, other acid addition salts are within the scope of the invention. Such salts include the hydrobromides, hydroiodides, sulfates, phosphates, citrates, sulfamates, tartrates, succinates, acetates, benzoates, oleates, and the like.

The following examples further illustrate specific embodiments of the invention.

EXAMPLE 1

(a) 2,3-methylenedioxy-6-nitro-9-chloroacridine

This compound was prepared by first heating 2-chloro-4-nitrobenzoic acid with 3,4-methylene-dioxyaniline in the presence of copper powder to produce 2-(3,4-methylenedioxyphenylamino)-4-nitrobenzoic acid, which was then heated in toluene solution with phosphorus oxychloride to effect ring closure. These procedures are given in the following paragraphs:

A solution of 98.5 g. of anhydrous potassium carbonate in 145 ml. of water was heated to 60° C. with stirring. To this solution was added 144 g. of 2-chloro-4-nitrobenzoic acid, followed by 8 g. of copper powder, 8 g. of a filter aid such as Filtercel (an infusorial earth), and 98.5 g. of 3,4-methylenedioxyaniline dissolved in 500 ml. of ethanol. Ethanol was then removed by distillation until an internal temperature of 95° C. was reached, and the resulting solution was refluxed for five hours. The reaction mixture was steam distilled to remove any unreacted aniline derivative. The aqueous residue was filtered while hot and the collected solid was extracted three times with boiling water. The combined filtrate and extracts were chilled in an ice bath and acidified with an excess of concentrated hydrochloric acid. The red solid that separated was collected and purified by recrystallization from acetone-water. There was thus obtained 106.3 g. of 2-(3,4-methylenedioxyphenylamino)-4-nitrobenzoic acid, M. P. 240–241° C.

Analysis.—Calcd. for C$_{14}$H$_{10}$N$_2$O$_6$: C, 55.63; H, 3.34; N, 9.27. Found: C, 55.52; H, 3.36; N, 9.40.

Ring closure was effected as follows: 106.3 g. of 2-(3,4-methylenedioxyphenylamino) - 4 - nitrobenzoic acid was dissolved in 1064 ml. of toluene. The solution was heated to reflux, heating stopped, and 155 g. of phosphorus oxychloride was added over a fifteen minute period. Heating was resumed at gentle reflux with stirring for three and one-half hours. The reaction mixture was cooled and the precipitate that separated was collected. The precipitate was added over a thirty minute period to a chilled (0° C.) solution containing 310 ml. of 10% aqueous sodium hydroxide solution and 410 ml. of water. The mixture was stirred for an additional two hours at 0° C. The solid was collected, triturated with ammonium hydroxide solution, washed with cold water and recrystallized from chlorobenzene. There was thus obtained 67.5 g. of 2,3-methylenedioxy-6-nitro-9-chloroacridine, M. P. 300–301° C.

*Analysis.*—Calcd. for $C_{14}H_7N_2ClO_4$: C, 55.55; H, 2.33; $N_{NO_2}$, 4.63; Cl, 4.71. Found: C, 55.51; H, 2.33; $N_{NO_2}$, 4.57; Cl, 11.82.

(b) *2,3-methylenedioxy-6-nitro-9-[2-(2-hydroxyethylamino)ethylamino]acridine*

A mixture of 9 g. of 2,3-methylenedioxy-6-nitro-9-chloroacridine and 50 g. of phenol was heated to 95° C. Heating was stopped and 3.8 g. of 2-(2-hydroxyethylamino)ethylamine was added causing a temperature rise to about 98° C. which soon subsided. Heating was then resumed for two hours after which time the reaction mixture was poured into a mixture of 60 ml. of concentrated hydrochloric acid and 300 ml. of acetone which had been chilled to 0° C. The resulting mixture was stirred for an hour at 0° C. and the resulting yellow-brown solid was collected, washed with cold acetone in ether and recrystallized twice by dissolving the solid in about 120 ml. of water at 80° C., filtering and adding to the filtrate at 60° C., 25 ml. of concentrated hydrochloric acid. The resulting orange microcrystalline precipitate was collected, washed respectively with acetone, an ether solution of hydrogen chloride and finally absolute ether. There was thus obtained 9.8 g. of 2,3-methylenedioxy-6-nitro - 9-[2-(2-hydroxyethylamino)ethylamino]acridine in the form of its dihydrochloride hemihydrate, M. P. above 300° C. (chars about 250° C.).

*Analysis.*—Calcd. for $C_{18}H_{18}N_4O_5 \cdot 2HCl \cdot \frac{1}{2}H_2O$: N, 12.38; Cl, 15.67; $H_2O$, 1.99. Found: N, 12.42; Cl, 15.38; $H_2O$, 1.89.

Following the above procedure in the absence of phenol, i. e., heating 2,3-methylenedioxy-6-nitro-9-chloroacridine directly with 2-(2-hydroxyethylamino)ethylamine, the same product, 2,3-methylenedioxy-6-nitro-9-[2-(2-hydroxyethylamino)ethylamino]acridine in the form of its dihydrochloride hemihydrate, can be obtained.

Other compounds, in the form of their dihydrochlorides, that can be prepared following the foregoing procedure using the appropriate hydroxyalkylaminoalkylamine in place of 2-(2-hydroxyethylamino)ethylamine include the following: 2,3-methylenedioxy-6-nitro-9-[3-(2-hydroxyethylamino)propylamino]acridine, 2,3-methylenedioxy - 6 - nitro-9-[3-(2-hydroxybutylamino)butylamino]acridine, 2,3-methylenedioxy-6-nitro-9-[4-(2-hydroxy-2-methylpropylamino)pentylamino]acridine, 2,3-methylenedioxy - 6 - nitro - 9-[8-(2-hydroxyethylamino)-octylamino]acridine, and the like.

EXAMPLE 2

(a) *2,3-ethylenedioxy-6-nitro-9-chloroacridine*

This compound was prepared following the procedure described under Example 1a, as follows:

2-(3,4-ethylenedioxyphenylamino)-4-nitrobenzoic acid was prepared using 124 g. of anhydrous potassium carbonate in 182 ml. of water, 180 g. of 2-chloro-4-nitrobenzoic acid, 6 g. of copper powder, and 136 g. of 3,4-methylenedioxyaniline in 1300 ml. of methanol. The product was obtained as golden-brown needles, M. P. 249–250.5° C. (cor.) when recrystallized from ethanol-water.

*Analysis.*—Calcd. for $C_{15}H_{12}N_2O_6$: C, 56.96; H, 3.38; $N_{NO_2}$, 4.43. Found: C,57.23; H, 3.53; $N_{NO_2}$, 4.32.

Ring closure was effected as in Example 1a using 86 g. of 2 - (3,4-ethylenedioxyphenylamino) - 4 - nitrobenzoic acid, 945 ml. of toluene and 113 g. of phosphorus oxychloride. The product, 2,3-ethylenedioxy-6-nitro-9-chloroacridine, melted at 282–284° C. (with decomposition) when recrystallized from chlorobenzene.

*Analysis.*—Calcd. for $C_{15}H_9N_2O_4Cl$: C, 56.88; H, 2.87; Cl, 11.19. Found: C, 57.42; H, 2.87; Cl, 11.50.

(b) *2,3-ethylenedioxy-6-nitro-9-[2-(2-hydroxyethylamino)ethylamino]acridine*

This preparation was carried out following the procedure described above for Example 1b using 9.5 g. of 2,3-ethylenedioxy - 6 - nitro - 9 - chloroacridine, 30 g. of phenol and 3.8 g. of 2-(2-hydroxyethylamino)ethylamine. There was thus obtained, as garnet microneedles, 2,3-ethylenedioxy - 6-nitro-9-[2-(2-hydroxyethylamino)-ethylamino]acridine in the form of its dihydrochloride, M. P. 235.5–238.0° C. (cor.) when recrystallized several times from water using concentrated hydrochloric acid for salting out.

*Analysis.*—Calcd. for $C_{19}H_{20}N_4O_5 \cdot 2HCl$: N, 12.25; Cl-, 15.15. Found: N, 12.25; Cl-, 15.45.

The foregoing 2,3-alkylenedioxy-6-nitro-9-(hydroxyalkylaminoalkylamino)acridines of my invention have antirickettsial activity, e. g., against epidemic typhus, as determined by the chick embryo technique.

I claim:

1. A compound selected from the group consisting of a 2-3-alkylenedioxy-6-nitro-9-(hydroxyalkylaminoalkylamino)acridine having the structure

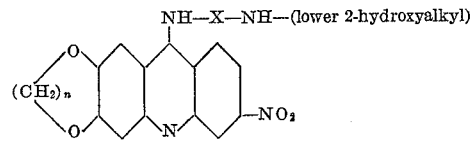

where X is a lower alkylene radical having from two to eight carbon atoms inclusive and having its free valence bonds on different carbon atoms and n is an integer from one to two, and acid addition salts thereof.

2. A 2,3 - methylenedioxy - 6 - nitro-9-(hydroxyalkylaminoalkylamino)acridine having the structure

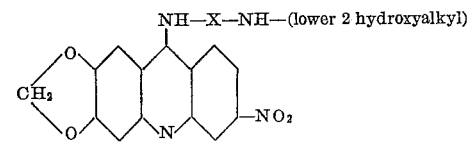

where X is a lower alkylene radical having from two to eight carbon atoms inclusive and having its free valence bonds on different carbon atoms.

3. A 2,3 - ethylenedioxy - 6 - nitro - 9 -(hydroxyalkylaminoalkylamino)acridine having the structure

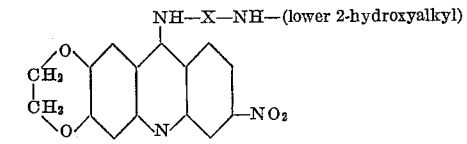

where X is a lower alkylene radical having from two to eight carbon atoms inclusive and having its free valence bonds on different carbon atoms.

4. A 2,3 - methylenedioxy - 6 - nitro-9-(hydroxyalkylaminoethylamino)acridine having the structure

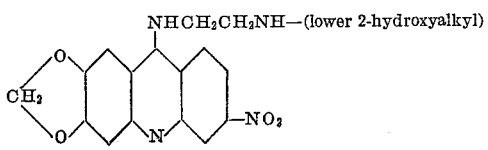

5. A 2,3 - ethylenedioxy - 6 - nitro-9-(hydroxyalkylaminoethylamino)-acridine having the structure

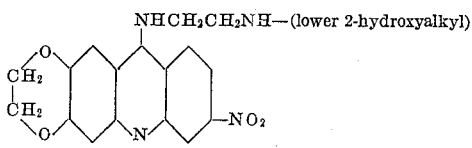

6. 2,3 - methylenedioxy - 6 - nitro-9-[2-(2-hydroxyethylamino)ethylamino]acridine.

7. 2,3-ethylenedioxy - 6 - nitro-9-[2-(2-hydroxyethylamino)ethylamino]acridine.

8. The process of preparing a 2,3-alkylenedioxy-6-nitro-9-(hydroxyalkylaminoalkylamino)acridine having the structure

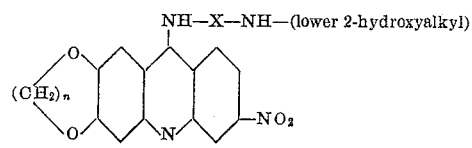

where X is a lower alkylene radical having from two to eight carbon atoms inclusive and having its free valence bonds on different carbon atoms and n is an integer from one to two, which comprises heating a member of the group consisting of the corresponding 2,3-alkylenedioxy-6-nitro-9-haloacridine and 2,3-alkylenedioxy-6-nitro - 9-phenoxyacridine with a hydroxyalkylaminoalkylamine having the formula $H_2N—X—NH$-(lower 2-hydroxyalkyl) under acidic conditions.

9. The process of preparing a 2,3-methylenedioxy-6-nitro-9 - (hydroxyalkylaminoalkylamino)acridine having the structure

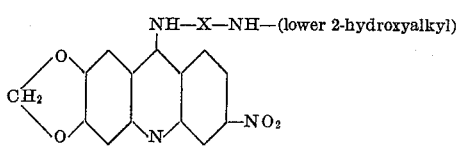

where X is a lower alkylene radical having from two to eight carbon atoms inclusive and having its free valence bonds on different carbon atoms, which comprises heating the corresponding 2,3-methylendioxy-6-nitro-9-phenoxyacridine with a hydroxyalkylaminoalkylamine having the formula $H_2N—X—NH$-(lower 2-hydroxyalkyl) under acidic conditions.

10. The process of preparing a 2,3-ethylenedioxy-6-nitro-9-(hydroxyalkylaminoalkylamino)acridine having the structure

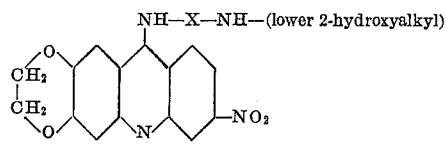

where X is a lower alkylene radical having from two to eight carbon atoms inclusive and having its free valence bonds on different carbon atoms, which comprises heating the corresponding 2,3-ethylenedioxy-6-nitro-9-phenoxyacridine with a hydroxyalkylaminoalkylamine having the formula $H_2N—X—NH$-(lower 2-hydroxyalkyl) under acidic conditions.

11. The process of preparing a 2,3-methylenedioxy-6-nitro-9 - (hydroxyalkylaminoethylamino)acridine having the structure

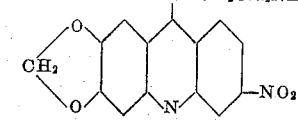

which comprises heating the corresponding 2,3-methylenedioxy-6-nitro-9-phenoxyacridine with a hydroxyalkylaminoethylamine having the formula $H_2NCH_2CH_2NH$-(lower 2-hydroxyalkyl) under acid conditions.

12. The process of preparing 2,3-ethylenedioxy-6-nitro-9-(hydroxyalkylaminoethylamino)acridine having the structure

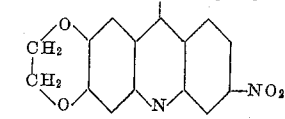

which comprises heating the corresponding 2,3-ethylenedioxy-6-nitro-9-phenoxyacridine with a hydroxyalkylaminoethylamine having the formula $H_2NCH_2CH_2NH$-(lower 2-hydroxyalkyl) under acidic conditions.

13. The process of preparing 2,3-methylenedioxy-6-nitro-9-[2-(2 - hydroxyethylamino)ethylamino]acridine, which comprises heating 2,3-methylenedioxy-6-nitro-9-phenoxyacridine hydrochoride with 2-(2-hydroxyethylamino)ethylamine.

14. The process of preparing 2,3-ethylenedioxy-6-nitro-9-[2 - (2 - hydroxyethylamino)ethylamino]acridine which comprises heating 2,3-ethylenedioxy-6-nitro-9-phenoxyacridine hydrochloride with 2-(2-hydroxyethylamino)ethylamine.

15. A compound selected from the group consisting of a 2,3-alkylenedioxy-6-nitro-9-haloacridine and a 2,3-alkylenedioxy-6-nitro-9-phenoxyacridine.

16. 2,3-methylenedioxy-6-nitro-9-chloroacridine.

17. 2,3-ethylenedioxy-6-nitro-9-chloroacridine.

18. 2,3-methylenedioxy-6-nitro-9-phenoxyacridine.

19. 2,3-ethylenedioxy-6-nitro-9-phenoxyacridine.

References Cited in the file of this patent
UNITED STATES PATENTS

| | | |
|---|---|---|
| 1,962,277 | Jensch | June 12, 1934 |
| 2,531,010 | Surrey | Nov. 21, 1950 |
| 2,531,012 | Surrey | Nov. 21, 1950 |
| 2,647,900 | Surrey | Aug. 4, 1953 |